Oct. 2, 1951 R. S. NEVIN, SR., ET AL 2,569,900
MECHANICAL VIBRATOR
Filed Feb. 23, 1950 3 Sheets-Sheet 1

INVENTORS
ROBERT S. NEVIN, SR.
CARLETON M. FIELDS,
BY
ATTORNEY

Oct. 2, 1951 R. S. NEVIN, SR., ET AL 2,569,900
MECHANICAL VIBRATOR
Filed Feb. 23, 1950 3 Sheets-Sheet 3

INVENTORS
ROBERT S. NEVIN, SR.
CARLETON M. FIELDS,
BY
ATTORNEY

Patented Oct. 2, 1951

2,569,900

UNITED STATES PATENT OFFICE 2,569,900

MECHANICAL VIBRATOR

Robert S. Nevin, Sr., Dundalk, and Carleton M. Fields, Baltimore, Md., assignors to The Glenn L. Martin Company, Middle River, Md., a corporation of Maryland Application February 23, 1950, Serial No. 145,868

4 Claims. (Cl. 74—50)

This invention relates to a mechanical vibrating apparatus for calibrating vibration pickup units.

Flight testing is a very important stage in the successful development of new aircraft designs. The results of these flight tests are determined from the recorded data taken during flight by instruments such as the accelerometer. All of these instruments must be accurately calibrated so as to produce reliable data for determining the stability and performance of the craft.

The accelerometer is probably the most important of all the flight test measuring instruments used, and the most difficult to accurately calibrate. As a result of an attempt to remove these difficulties, a vibrator table was developed and disclosed in patent application bearing Serial No. 608,022, now Patent No. 2,505,601, issued April 25, 1950, which produces simple harmonic (sinusoidal) motions of varying frequencies and amplitudes for calibrating vibration pickup units. This apparatus was so constructed as to enable the frequency of the vibration to be varied while in operation by changing the speed of rotation of the eccentric mass, while the amplitude variations could be made only by stopping the vibrator and resetting the degree of eccentricity. This latter requirement of stopping the vibratory motion before varying the amplitude detracts from the utility of the device in that the calibrating cannot be done in continuous operation resembling that which is encountered in actual flight. Even though only simple vibratory motion is set up by such a vibrator, as contrasted with the complex vibrations experienced in aircraft structures, the effects of varying both the frequency and amplitude during continuous operation of the device will more nearly reproduce the actual dynamic flight test conditions and insure a more accurate instrument calibration.

It is an object of this invention to provide a mechanical vibrator which will produce simple harmonic motion throughout a wide range of frequencies and amplitudes.

Another object of this invention is to provide a vibrator wherein both the frequency and amplitude of the produced vibrations may be varied during its operation and wherein the amplitude of the produced vibrations may be steplessly and positively controlled within the operating range by external adjustment while the vibrator is operating.

Another object of this invention is to provide a mechanical vibrator capable of producing controlled frequency and amplitude accelerations simultaneously or individually with respect to one another.

Further and other objects will become apparent from the accompanying description and drawings which form a part of this disclosure and in which like numerals refer to like parts.

Figure 1:
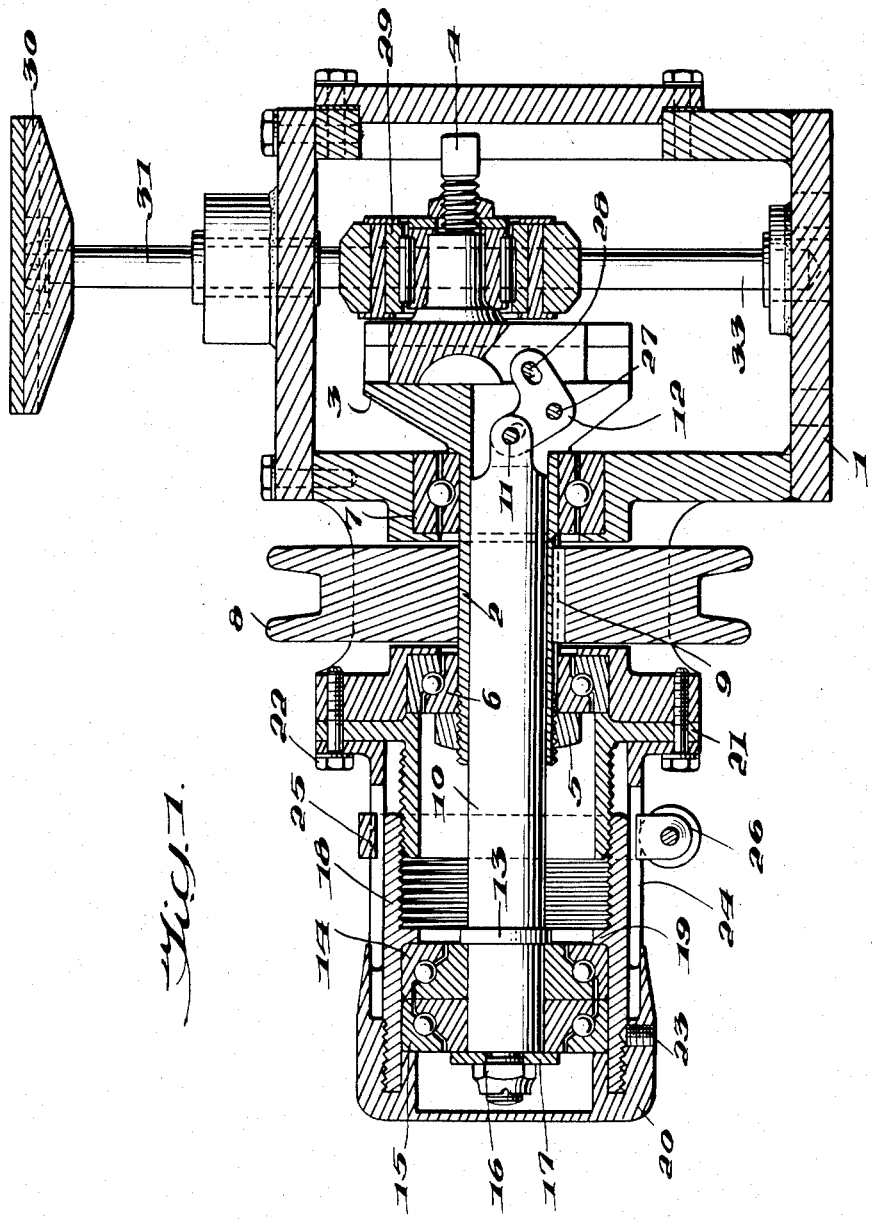
Figure 1, is a sectional side view of the vibrator table of this invention showing in detail the component parts and their relationship to one another within the frame.

Specifically referring to the drawings, the mechanical vibrator includes frame 1 supporting the rotatable hollow outer shaft 2 as shown in Figure 1. At one end of shaft 2 is a head 3 having a T-slot 3' cut therein for slidably engaging mating portion 4' on extension 4 as shown most clearly in Figure 2. The other end of shaft 2 is threaded so as to engage nut 5 to prevent shaft 2 from moving axially in bearings 6 and 7 journalling the shaft for rotation as shown in Figure 1. Bearings 6 and 7 are supported by frame 1. Pulley 8 is rigidly connected to shaft 2 by key 9 to provide a means for axially rotating shaft 2. Control rod 10 extends axially into the hollow portion of shaft 2 and extends therein nearly to head 3 where it is pivotally connected by pin 11 to bell crank 12. Bell crank 12 is pivotally supported by pin 27 on head 3 of hollow shaft 2.

Near the other end of control rod 10, a flange 13 extends radially outwardly and circumferentially around shaft 10 to contact thrust bearing 14. Control rod 10, beyond flange 13, extends axially through, and is journalled by thrust bearings 14 and 15. The portion of inner shaft 10 which extends beyond thrust bearings 14 and 15 is provided with threads, which engage nut 16. A washer 17 is interposed between nut 16 and bearing 15. Inner shaft 10 is therefore held against axial movement with respect to thrust bearings 14 and 15 by flange 13 and the washer, and nut assembly as shown in Figure 1.

Thrust bearings 14 and 15, circumferentially engage movable sleeve 18 and are held in fixed relation thereto by radially inwardly projecting flange 19 and cap 20. Movable sleeve 18 is threaded on a portion of its interior wall for engaging threads on the exterior wall of inner sleeve 21, flanged so as to be supported on frame 1 by bolts 22. Movable sleeve 18 is threaded on a portion of its outer wall for engaging threads in cap 20. After cap 20 is screwed down tight to butt against thrust bearing 15, a lock screw 23 is inserted in the threaded hole 23' (Fig. 2) of cap 20 to prevent any relative rotational movement between cap 20 and movable sleeve 18. By screwing cap 20 and movable sleeve 18 in and out on inner sleeve 21, control rod 10 is moved longitudinally with respect to its axis. Thrust bearings 14 and 15 permit rotation of control rod 10 independently of its longitudinal adjustment means.

Figure 2:
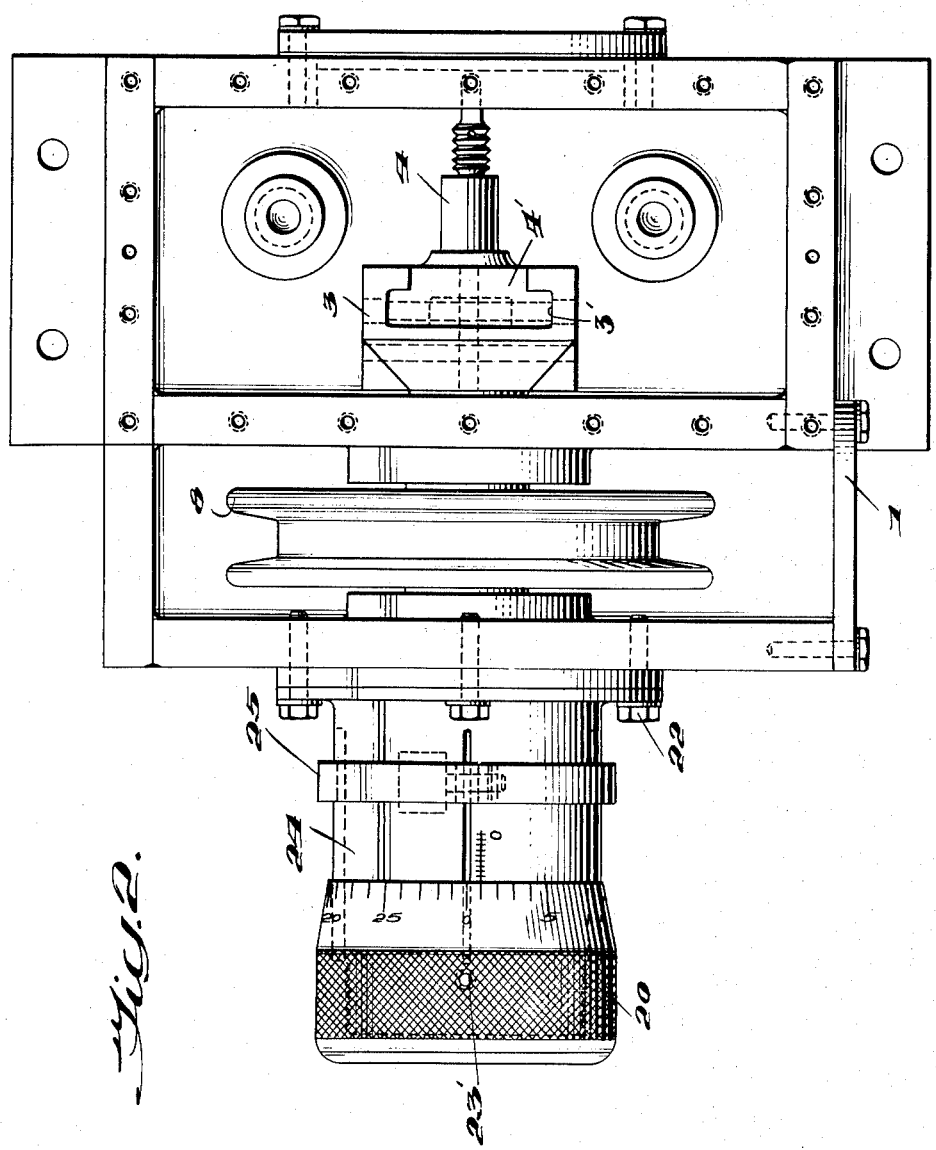
Figure 2, is a top view of the vibrator with the table and Scotch yoke assembly removed showing the external adjustment means for amplitude and the T-slot head and yoke axle assembly.

Locking sleeve 24, rigidly connected to frame 1 by bolts 22, slidably engages a portion of the outer surface of movable sleeve 18. Locking sleeve 24 is slit as shown so that locking ring 25 may be tightened by hand nut 26 to deflect locking sleeve 24 inwardly and tightly against movable sleeve 18 to prevent axial movement of control rod 10 from a desired amplitude setting. Cap 20 and locking sleeve 24 are provided with a graduated scale to indicate the axial position of control rod 10 as shown in Figure 2.

Figure 3:
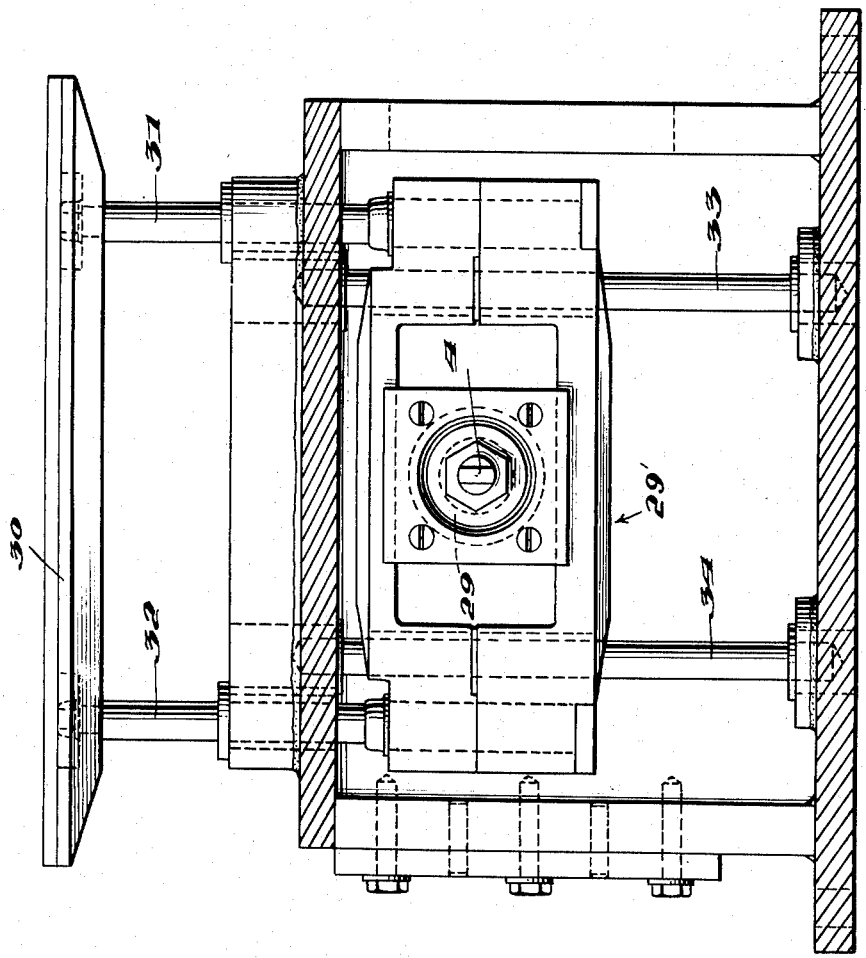
Figure 3, is an end view of the vibrator having the end wall removed to show the table and Scotch yoke assembly.

Bell crank 12, pinned at 11 to control rod 10, is also pinned at 27 to head 3 of hollow shaft 2 about which it pivots to vary the eccentricity of extension 4 through pin 28. Moving control rod 10 axially as described above, causes arcuate movement of bell crank 12 which in turn causes radial movement of extension 4. Head 3 and extension 4 are slotted to permit bell crank 12 to pivot therein without binding. Extension 4 supports a bearing and Scotch yoke assembly 29 which connects to vibrating table 30 through shafts 31 and 32 as most clearly shown in Figure 3. Guide members 33 and 34 extending through the yoke portion of assembly 29, limit the movement of table 30 to one plane, producing pure harmonic motion.

A variable speed power source (not shown) drives the vibrator by rotating shaft 2 through pulley 8. Control rod 10, connected to shaft 2 through bell crank 12 rotates therewith as does extension 4. The amount of eccentricity between the axis of extension 4, supporting the Scotch yoke assembly 29, and the axis of hollow outer shaft 2 determines the amplitude of the vibration produced at table 30. The eccentricity may be varied by simply screwing movable sleeve 18 outwardly or inwardly by applying a torsional force on cap 20. This moves control rod 10 axially, independently of its rotational movement. To vary the frequency of the vibration, the rotating speed of pulley 8 is varied through the external power source. If it is desired to hold a certain amplitude setting of cap 20, locking ring 25 is tightened around locking sleeve 24 to prevent any inadvertent rotational movement of cap 20 and movable sleeve 18. The two movable pivot pins 11 and 28, connected to control rod 10 and extension 4 respectively, extend into slotted openings in bell crank 12. These slotted openings compensate for arcuate movement of the bell crank to allow free linear motion of control rod 10 and extension 4 throughout the full range of amplitude adjustments. Other compensating devices such as a linkage between bell crank 12 and the connecting members may be substituted for the slotted openings. As outer hollow shaft 2 rotates, the eccentricity of extension 4 produces a circular motion with the axis of shaft 2 as its center which the Scotch yoke assembly 29 converts into pure harmonic vibrations.

It is to be understood that certain changes, alterations, modifications and substitutions can be made without departing from the spirit and scope of the appended claims.

We claim as our invention:

1. A mechanical vibrator capable of producing sinusoidal motion of controlled variable amplitude including a frame, a vibrating table and means for vibrating said table, said means comprising a hollow shaft rotatably supported by said frame, a radially adjustable extension connected to said shaft for producing eccentric motion upon rotation of said shaft, means connecting said extension to said table, a control rod extending axially through said shaft, means connecting said rod with said extension whereby axial movement of said rod causes radial movement of said extension, an adjustment cap and sleeve assembly threadedly engaging said frame for rotational and axial movement therewith, clamping means associated with said sleeve for holding said assembly against inadvertent rotation relation to said frame, and means securely mounted within said assembly and engaging said control rod in a manner which permits independent rotation but no axial movement therebetween whereby the amplitude of said sinusoidal motions may be varied irrespective of the rotational movement of said rod during the operation of said vibrator.

2. A mechanical vibrator capable of producing motion of a sinusoidal form having controlled variable amplitude including a frame, a vibrating table and means for vibrating said table, said means comprising a hollow shaft rotatably supported by said frame, a radially adjustable extension connected to said hollow shaft for producing eccentric motion upon rotation of said hollow shaft, means connecting said extension to said table, a control rod extending through said hollow shaft, a lever carried by said shaft and connecting with one end of said rod and with said extension, said rod, lever and extension being movable relative to said shaft whereby the eccentricity of said extension may be varied for changing the amplitude output of said vibrator, and means connected to said control rod and carried by said frame for controlling the relative movement of said control rod independently of any rotational movement occurring from the operation of said vibrator.

3. A mechanical vibrator capable of producing pure harmonic vibrations of controlled variable amplitude including a frame, a vibrating table, and means for vibrating said table, said means comprising a hollow shaft rotatably supported by said frame, a radially adjustable extension connected to said shaft for producing eccentric motion upon rotation of said shaft, a Scotch yoke carried by said extension for supporting said table and converting eccentric motion into pure harmonic vibrations, a control rod axially movable through said hollow shaft, a bell crank pivotally connected to said rod, shaft and extension for varying said radial adjustment of said extension through said axial movement of said rod, an adjustment cap and sleeve assembly threadedly engaging said frame for rotational and axial movement therewith, and a thrust resisting bearing securely mounted within said assembly and engaging said control rod in a manner which permits independent rotation but no axial movement therebetween, whereby the amplitude of said vibrations may be varied irrespective of the rotational movement of said rod during the operation of said vibrator.

4. A mechanical vibrator capable of producing sinusoidal motion of controlled variable amplitude including a frame, a vibrating table and means for vibrating said table, said means comprising a hollow shaft rotatably supported by said frame, a radially adjustable extension connected to said shaft for producing eccentric motion upon rotation of said shaft, a Scotch yoke carried by said extension for supporting said table and converting eccentric motion into pure harmonic vibrations, a control rod axially movable through said hollow shaft, a bell crank operatively connected to said rod, shaft and extension for varying said radial adjustment of said extension through said axial movement of said rod, and means supported by said frame and connected to said rod for producing axial movement thereof independently of any rotational movement occurring from the operation of said vibrator.

ROBERT S. NEVIN, Sr.
CARLETON M. FIELDS.

REFERENCES CITED

The following references are of record in the file of this patent:

UNITED STATES PATENTS

| Number | Name | Date |
|---|---|---|
| 1,499,716 | Worcester | July 1, 1924 |
| 1,575,027 | Barnes | Mar. 2, 1926 |
| 2,354,980 | Arros | Aug. 1, 1944 |
| 2,463,604 | Denyssen | Mar. 8, 1949 |
| 2,505,601 | Bender et al. | Apr. 25, 1950 |